UNITED STATES PATENT OFFICE.

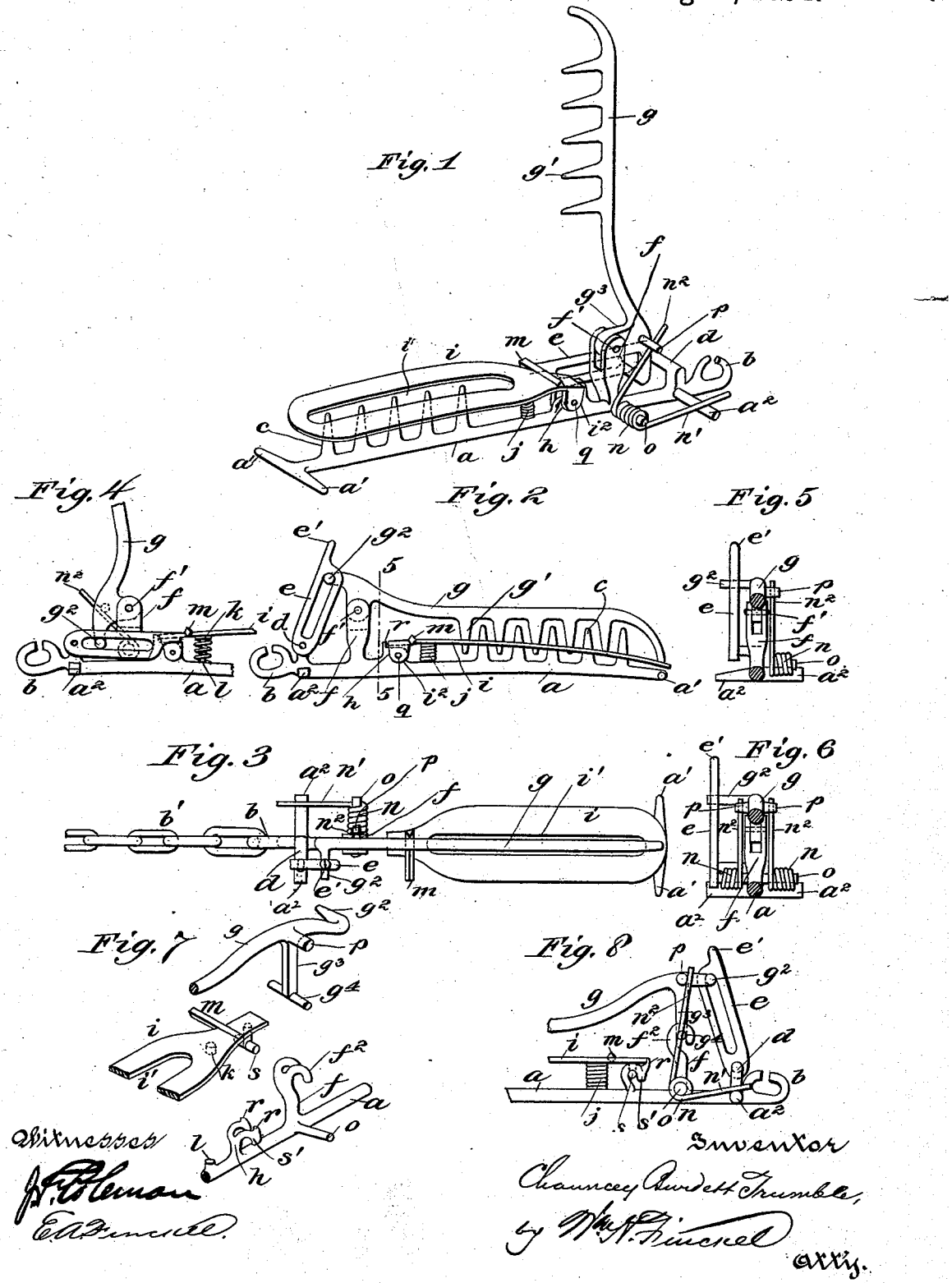

CHAUNCEY BURDETT TRUMBLE, OF GROTON, NEW YORK, ASSIGNOR OF ONE-HALF TO HIRAM G. MOE, OF SAME PLACE.

ANIMAL-TRAP.

SPECIFICATION forming part of Letters Patent No. 524,228, dated August 7, 1894.

Application filed March 26, 1894. Serial No. 505,086. (No model.)

*To all whom it may concern:*

Be it known that I, CHAUNCEY BURDETT TRUMBLE, a citizen of the United States, residing at Groton, in the county of Tompkins and State of New York, have invented a certain new and useful Improvement in Self-Setting Animal-Traps, of which the following is a full, clear, and exact description.

This invention relates to an animal trap which is specially designed for use in the runways of vermin and other small animals, although it is applicable for use as a game trap.

A main object of the invention is to simplify and improve the constructions illustrated in my patents, No. 465,418, granted December 15, 1891, and No. 481,707, granted August 30, 1892.

In the present invention the base is provided with lateral projections by means of which the trap is rendered more stable and may be set and handled without danger to the operator; the pan is provided with a spring and a stop; the trigger is permanently engaged with the upper jaw; a coiled spring is used which is supported on a lug on the base and bears at one end against a lug on the upper jaw to close said jaw and at its other end against a lug on the base by which it is provided a resistance; and the pan, jaw and spring are made detachable for repairs or renewals, all as I will proceed now more particularly to set forth and finally claim.

In the accompanying drawings illustrating my invention, in the several figures of which like parts are similarly designated, Figure 1 is a perspective view of the trap set. Fig. 2 is a side elevation of the trap sprung. Fig. 3 is a plan view of the trap sprung, and also showing a section of chain applied thereto for anchoring the same. Fig. 4 is a side elevation of the setting end of the trap showing the trap set. Fig. 5 is a sectional elevation taken in the plane of line 5—5, Fig. 2. Fig. 6 is a similar view of a trap provided with two springs and intended specially for use as a game trap. Fig. 7 is a perspective view, with the parts disassembled, illustrating a modification in the manner of pivoting the jaw and pan; and Fig. 8 is a side elevation of these parts assembled and sprung.

$a$ is the base, provided at the forward end with the lateral projections $a'$, $a'$, and at the rear with the lateral projections $a^2$, $a^2$, whereby the base is given a firm support; the lateral projections $a'$, $a'$, being also useful to receive the fingers of one hand while the other hand is used to set the trap, and being further useful in handling the trap without danger of injury to the operator.

$b$ is an eye to which a section of chain, or other anchoring medium, $b'$, may be applied, as shown in Fig. 3.

The base $a$ is provided with a number of upwardly-projecting prongs or teeth $c$; and it is also provided with a right-angled stud $d$, to which is pivoted the trigger $e$.

From the base rises standard $f$, to which is pivoted the upper jaw $g$, the said jaw having a number of teeth or prongs $g'$, which when the trap is sprung, alternate with the teeth or prongs $c$ of the base $a$. This upper jaw $g$ is provided with a rearward extension terminating in a laterally-projecting lug $g^2$, and this lug $g^2$ extends through and works in the slotted trigger $e$, so that the jaw and the trigger are in permanent engagement and the trigger follows the jaw as the jaw is moved.

$h$ is a standard rising from the base $a$, to which is pivoted a pan $i$, and said pan is slotted longitudinally, as indicated at $i'$, Fig. 3, to surround laterally the teeth or prongs of the two jaws. This pan is held in an elevated position substantially in the plane of the top of the teeth or prongs of the base by means of a spring $j$ placed between it and the base and held in position by means of the lugs $k$ and $l$ projecting from the pan and base respectively. The pan is provided with a laterally projecting finger $m$ with which the nose $e'$ of the trigger engages when the upper jaw has been raised into the position indicated in Figs. 1 and 4, to set the trap, and since the said trigger engages with the lug $g^2$ on the upper jaw, and the said lug, when the said upper jaw is in the set position, is in substantially the plane of the finger $m$, it follows that the said jaw will be locked in said position when the nose $e'$ of the trigger is in engagement with the finger $m$ of the pan; and, at the same time, the said pan will be held in its elevated position under the tension of the spring and the stress of the trigger.

In order to give force to the descending upper jaw sufficient to impale an animal between the upper jaw and the prongs of the base, I provide a coiled spring $n$, the coil of which is supported upon a lug $o$ projecting laterally from the base, and one end $n'$ of this spring rests upon one of the lateral projections $a^2$ of the base, and the other end $n^2$ of said spring bears upon the rear side of a lug $p$ projecting laterally from the upper jaw, so that the stress of the spring is exerted upon the upper jaw so as to cause it to descend forcibly. By this form of spring I am enabled to obtain, in very small compass, a very stout and stiff spring, and thus make a very quick-acting and effective trap. Where the trap is designed for use in catching large animals or game, in order to increase the force of the jaw, I may duplicate this coiled spring on opposite sides of the jaw, as indicated in Fig. 6.

In Figs. 1 to 6, the upper jaw is shown as provided with a downwardly-projecting lug $g^3$, which is fitted between ears of the standard $f$ and secured therein by means of a cross-pin or rivet $f'$, and this pin or rivet may be removed at pleasure, when it is desired to remove the jaw for purposes of repair or replacement. The pan is shown in these figures also as having downwardly-projecting ears $i^2$ which straddle the standard $h$, and a pin or rivet $q$ is used to unite these parts, the said pin or rivet being removable for the removal or replacement of the pan when necessary.

In order to limit the upward movement of the pan, the standard $h$ is provided with a stop-piece $r$, which co-operates with the rear end of the pan to this end.

In the modifications shown in Figs. 7 and 8, the lug $g^3$ depending from the upper jaw has the cross-head $g^4$ made integral therewith, and the standard $f$ is provided with a forked hook $f^2$ which receives the cross-head $g^4$, and the pan is provided with the depending cross-head $s$ engaging forked hook $s'$ of the standard $h$, the springs serving to hold the pan and the upper jaw in engagement with the forked standards in this form of the invention.

Various other modifications of the details of construction are within the scope of my invention, but I have shown and described the best form in which I have contemplated applying the principle of my invention.

The base and all of its appurtenances may be made as a single casting of malleable metal; the pan and its appurtenances may be similarly constructed, and the jaw and its appurtenances likewise constructed, and the various springs may be made of spring steel wire, or other suitable material, and these parts assembled very readily, and thus a trap is produced at very low first cost and may be sold at correspondingly low figures.

The trap is very strong, very efficient, and very durable, as well as exceedingly simple, not liable to derangement and capable of ready repair.

Instead of making the trap by casting, its parts may be constructed of wrought metal or sheet or plate metal by any usual processes or machinery.

What I mean by self-setting, is that the trigger acts automatically to engage the pan when the upper jaw is raised by hand, as in Figs. 1 and 4, and when such engagement is effected, the upper jaw is retained in its raised position, the pan elevated and rendered responsive to downward pressure, and the trap thus set.

The pan may be used to receive bait, or a bait holder may be added to the trap, but since the trap is designed primarily to be set in runways, bait ordinarily will be unnecessary.

The operation is obvious from the foregoing, but it may be said that when the jaw is raised and the trigger is engaged with the finger of the pan, as in Figs. 1 and 4, any pressure upon the pan in advance of its pivot, will cause such pan to turn upon its pivot, and since the finger $m$ of said pan is eccentric with relation to its pivot, the said finger will be disengaged from the trigger and thus leave the spring $n$ free to act upon the jaw and cause its forcible descent. The spring-elevated pan breaks the force of the descending spring jaw before it reaches the base proper, and so saves the parts from undue concussion while not materially lessening the effective blow of the descending jaw upon the animal.

What I claim is—

1. An animal trap having a base provided with lateral end projections from both sides, a lateral lug on said base, a standard rising from the base, a jaw pivoted to such standard and having a lateral lug, and a coiled spring arranged upon the base lug and engaging the lug on the jaw, a pan, and a trigger connected with the jaw and adapted to engage the pan to set the jaw, substantially as described.

2. An animal trap having a base provided with lateral end projections from both sides and at both ends, a lateral lug on such base, a standard rising from said base, a jaw pivoted to such standard and having a lateral lug, and a coiled spring arranged upon the base lug and engaging the lug on the jaw, a pan, and a trigger connected with the jaw and adapted to engage the pan to set the jaw, substantially as described.

3. An animal trap having a base, a lateral lug thereon, a standard rising from such base, a jaw pivoted to such standard and having a lateral lug, and a coiled spring arranged upon the base lug and engaging the lug on the jaw, a pan, and a trigger connected with the jaw and adapted to engage the pan to set the jaw, substantially as described.

4. An animal trap having a base, a lateral lug thereon, a standard rising from such base, a jaw pivoted to such standard and having a lateral lug, and a coiled spring arranged upon the base lug and engaging the lug on the jaw, a pan also pivoted to said base, a pan elevating spring and a pan stop on the base, and a trigger connected with the jaw and adapted to engage the pan to set the jaw, substantially as described.

5. An animal trap having a base, a lateral lug thereon, a rear end lateral projection, and a standard rising from the face of such base, a jaw pivoted to such standard and having a lateral lug, and a coiled spring arranged upon the base lug and having one end engaging the rear end projection on the base and the other end engaging the lug on the jaw, a pan, and a trigger pivoted to the base and connected with the jaw and adapted to engage the pan to set the trap, substantially as described.

6. An animal trap comprising a base having a laterally projecting stud, a jaw pivoted to such base, and having a laterally projecting lug, a spring interposed between said base and jaw and normally tending to close such jaw, and a longitudinally slotted trigger pivoted to such stud and engaging permanently said lug, substantially as described.

7. An animal trap comprising a base having a laterally projecting stud, a jaw pivoted to such base and having a laterally projecting lug, a spring interposed between said base and jaw and normally tending to close such jaw, and a longitudinally slotted trigger pivoted to said stud and engaging permanently said lug and having a nose at its leading end, combined with a pan pivoted to said base and having a finger arranged eccentrically with relation to its pivot and adapted to be engaged by said nose to set the trap, substantially as described.

8. An animal trap having a base, a lateral lug thereon, a rear end lateral projection, and a standard rising from the face of such base, a jaw pivoted to such standard and having a lateral lug, and a coiled spring arranged upon the base lug and having one end engaging the rear end projection on the base and the other end engaging the lug on the jaw, a pan pivoted to such base and having a normally elevating spring interposed between itself and the base, and a trigger pivoted to the base and connected with the jaw and adapted to engage the pan to set the trap, substantially as described.

9. An animal trap having a base, a lateral lug thereon, a rear end lateral projection and two standards rising from the face of such base, a jaw detachably pivoted to one of such standards and having a lateral lug, a coiled spring arranged detachably upon the base lug and having one end engaging the rear end projection on the base and the other end engaging the lug on the jaw, a pan detachably pivoted to the other standard on the base, and a trigger pivoted to the base and connected with the jaw and adapted to engage the pan to set the trap, substantially as described.

In testimony whereof I have hereunto set my hand this 10th day of March, A. D. 1894.

CHAUNCEY BURDETT TRUMBLE.

Witnesses:
H. G. MOE,
W. D. GALE.